United States Patent [19]

Toya

[11] Patent Number: 5,487,140
[45] Date of Patent: Jan. 23, 1996

[54] DATA PROCESSING APPARATUS FOR OBTAINING PATTERN-IMAGE DATA

[75] Inventor: Masumi Toya, Akishima, Japan

[73] Assignee: Casio Computer Co., Ltd., Tokyo, Japan

[21] Appl. No.: 156,852

[22] Filed: Nov. 23, 1993

[30] Foreign Application Priority Data

Dec. 21, 1992 [JP] Japan ..................... 4-340299

[51] Int. Cl.$^6$ ..................................... G06F 15/72
[52] U.S. Cl. ................................................. 395/135
[58] Field of Search ......................... 395/133, 135, 395/155, 161; 434/155; 382/48, 46

[56] References Cited

U.S. PATENT DOCUMENTS

| | | | |
|---|---|---|---|
| 4,841,575 | 6/1989 | Welsh et al. | 381/36 |
| 4,852,184 | 7/1989 | Tamura et al. | 382/48 |
| 4,887,304 | 12/1989 | Terzian | 434/155 |
| 4,956,704 | 9/1990 | Yamada | 358/80 |
| 5,057,019 | 10/1991 | Harvey | 434/155 |
| 5,285,193 | 2/1994 | Iwasaki et al. | 345/133 |

FOREIGN PATENT DOCUMENTS

| | | |
|---|---|---|
| 0275124A3 | 7/1988 | European Pat. Off. . |
| 2606244 | 5/1988 | France . |
| 3-129572 | 6/1991 | Japan . |

Primary Examiner—Phu K. Nguyen
Attorney, Agent, or Firm—Frishauf, Holtz, Goodman, Langer & Chick

[57] ABSTRACT

A data processing apparatus is provided with a part memory, which stores a plurality of part patterns of each of components which compose an object. A video signal of an image of the object, a montage of which is to be composed, is entered through an image-data input unit to an image memory to be stored therein. Image data stored in the image memory includes component-image data corresponding to the components. The component image data corresponding to a component is read out in accordance with basic position data of the component stored in a basic position memory. The plurality of part patterns stored in the part memory are compared with the component-image data in a pattern matching unit. The part patterns of the highest degree of resemblance are selected with respect to all the components, and are combined to be displayed on a display unit.

20 Claims, 4 Drawing Sheets

DATA PROCESSING APPARATUS FOR OBTAINING PATTERN-IMAGE DATA

BACKGROUND OF THE INVENTION

1. Field of the Invention

The present invention relates to an image process which obtains image data of an external view of an object and converts the obtained image data into pattern-image data, and more particularly to a data processing apparatus which is used to electronically make a portrait of a person.

2. Description of the Related Art

A conventional electronic note book with a portrait composing function is provided with a part memory for storing plural sorts of bit map patterns for each of face parts of a human face such as eyes, a nose, a mouth, eyebrows, a face outline and a hair style. In this conventional electronic note book, part patterns for the respective face parts are selectively read out from the part memory by key input operations, and are combined on a display unit to compose a portrait of a person.

The conventional electronic note book, however, has a drawback that, with the small number of sorts of part patterns prepared and stored in the part memory, it is difficult to composing a good portrait of a person which much resembles an image of the person.

A large number of sorts of part patterns for each of the parts which are previously prepared and stored in the part memory will allow to compose a good portrait showing resemblance to the real person but it requires a user to do annoying and troublesome work to select appropriate part patterns out of a large number of part patterns and further it is very difficult to judge whether the selected part pattern is the best one among the plural sorts of part patterns.

SUMMARY OF THE INVENTION

The present invention has been made in the light of above mentioned situations and has an object to provide a data processing apparatus which is capable of composing a pattern-image or a portrait of a person which shows a good resemblance to an image of the person without requiring the user to do irritating operations in selecting proper part patterns.

According one aspect of the invention, there is provided a data processing apparatus which comprises:

input means for inputting image data of a face of a person, the image data obtained by taking a picture of the person;

image-data storing means for storing the image data input by said input means;

component-data storing means for storing a plurality of pattern data of each of components which compose a human face, said components of the human face including at least eyes, a nose and a mouth, and said plurality of pattern data representing different shapes of the component, respectively;

component-deriving means for deriving component-image data corresponding to one of the components from the image data stored in said image-data storing means;

judging means for determining degree of resemblance of the pattern data of each of the components to the component-image data of the relevant component derived by said component-deriving means; and processing means for designating pattern data of the highest degree of resemblance with respect to all the components based on the degree of resemblance determined by said judging means, and for combining the designated pattern data to compose a portrait of the person, whereby a portrait is composed which shows a better resemblance to the face of the person.

With the above structure of the data processing apparatus, once the image data of the face image of the person has been entered and stored in the image-data storing means, a component-image data for each of components derived from the image data stored in the image storing means is compared with each of the plurality of patterns data for each of the components which are previously stored in the component-data storing means, the pattern data showing the best resemblance to the relevant component-image data is selected for each of the components, and the selected pattern data are combined to compose a portrait by the part combining means, whereby a portrait showing a good resemblance to the image of the person is composed.

It would be apparent to those skilled in the art from the following description of preferred embodiments that the present invention may be modified in various manners and may be applicable to other apparatus.

BRIEF DESCRIPTION OF THE DRAWINGS

Other objects and structures of the present invention will be more fully understood from the description, when taken in conjunction with the accompanying drawings, in which:

FIGS. 3(A)–3(C) are flow charts of a portrait composing process in the data processing apparatus, in which FIG. 3(A) is a flow chart of the fundamental process in the portrait composing process, FIG. 3(B) is a flow chart of a part disassembling process and FIG. 3(C) is a flow chart of a pattern matching process.

DETAILED DESCRIPTION OF THE PREFERRED EMBODIMENT

A preferred embodiment of the data processing apparatus according to the present invention will be described with reference to the accompanying drawings.

Figure 1:
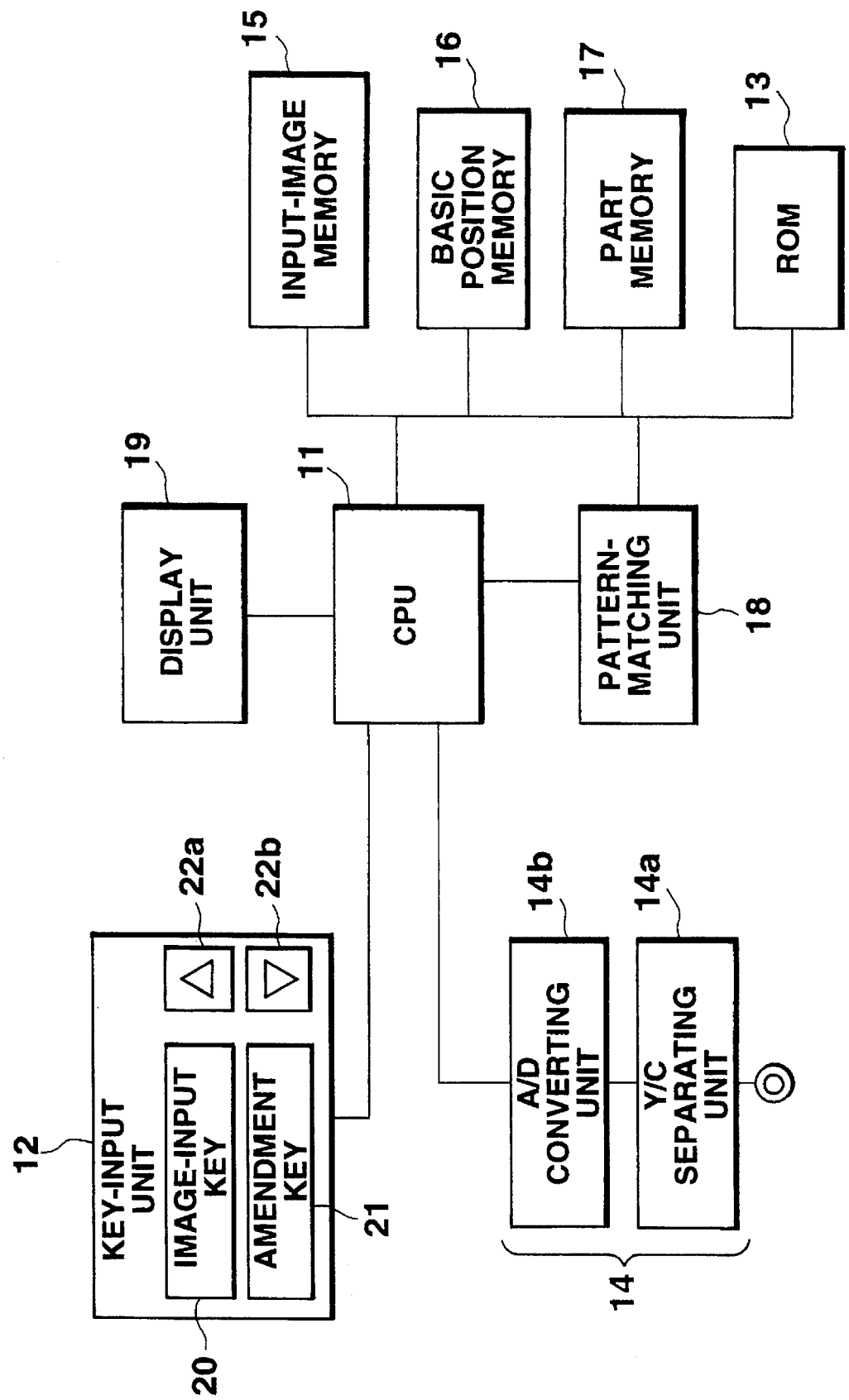
FIG. 1 is a block diagram of an embodiment of a data processing apparatus with a portrait composing function according to the present invention.

FIG. 1 is a circuit diagram of the embodiment of the data processing apparatus, which is provided with a central processing unit (CPU) 11 as shown therein.

In response to a key-operation signal sent from a key-input unit 12, the CPU 11 controls operations of circuits connected therewith in accordance with a portrait composing program stored in a ROM 13. The CPU 11 is connected with the above key-input unit 12, the ROM 13, an image-data input unit 14, an input-image memory 15, a basic position memory 16, a part memory 17, a pattern-matching unit 18 and a display unit 19.

The key-input unit 12 is provided with function keys such as an image-input key 20, an amendment key 21 and pattern-selecting keys 22a and 22b. The image-input key 20 is operated to input an image of a face of an object person. The amendment key is operated when the composed portrait is amended. The pattern-selecting keys 22a and 22b are operated when a candidate part-pattern for the part to be amended is selected in a portrait amending mode.

The above image-data input unit 14 is used to input a video signal (for one field) of a face image of the object person, which is generated, for example, by a video camera or an electronic still camera. The image-data input unit 14 is further provided with a Y/C separating unit 14a and an A/D converting unit 14b.

The Y/C separating unit 14a separates a luminance signal Y from the video signal, which is composed of the luminance signal Y and a chrominance signal C. The separated luminance signal Y is supplied from the Y/C separating unit 14a to the A/D converting unit 14b.

The A/D converting unit 14b converts the luminance signal of one field supplied from the Y/C separating unit 14a into black and white binary digital data in synchronism with a previously set sampling clock signal. An image data or the black and white binary digital data obtained by the A/D converting unit 14b is transferred to and stored in the input-image memory 15.

In other words, the image data of the face of the object person is stored as bit-map data in the input-image memory 15. In this case, it is preferable to take a picture of the face of the person such that the face will occupy a predetermined space on the picture. The image data of the face is stored in the input-image memory 15 such that data of an image area corresponding to a nose of the face is stored around at a central portion of a memory area of the input-image memory 15.

Therefore, image data corresponding to the "eyes", "eyebrows", "mouth" of the person are stored respectively at relevant positions on the memory area of the input-image memory 15.

For example, in the case the input-image memory 15 has a memory capacity of 48 by 48 dots, the image data corresponding to the "nose" is stored in the central memory portion of 8 by 10 dots on the memory area of the memory 15, the image data corresponding to the "mouth" is stored in the memory portion of 10 by 6 dots below the above central memory portion of the "nose", and the image data corresponding to the "eyes" are stored in the memory portions of 8 by 4 dots, respectively, right upper and left upper to the above central memory portion of the "nose".

Image data corresponding to an outline of the face is stored in the lower half portion of 48 by 24 dots of the memory area except the memory portions for the "nose" and "mouth". Image data corresponding to a hair style of the face is stored in the upper half portion of 48 by 24 dots of the memory area except the memory portions for the "eyes" and "eyebrows".

A face image of a person is divided into face parts or face elements such as hair, eyebrows, eyes, a nose, a mouth, ears and so on. Memory portions (basic positions) in the memory area of the input-image memory 15 where the image data corresponding respectively to these face parts (face elements) are stored are stored as address data in the basic position memory 16. Each of the address data is composed of four addresses which define four corners of a rectangular memory portion of the memory area of the memory 15, in which rectangular memory portion image data of one of the face parts is stored. The image data corresponding to each of the face parts such as hair, eyebrows, eyes, a nose, a mouth, ears and so on is read out from the input-image memory 15 in accordance with the address data stored in the basic position memory 16.

The part memory 17 stores plural sorts of part patterns for each face part at a predetermined memory area thereof as bit map data. Each of part patterns bears a pattern number: "1" to "20". One of the part patterns for each of face parts is read out from the part memory 17, and the read out part patterns for all the face parts are combined to compose a portrait of a person.

Figure 2:
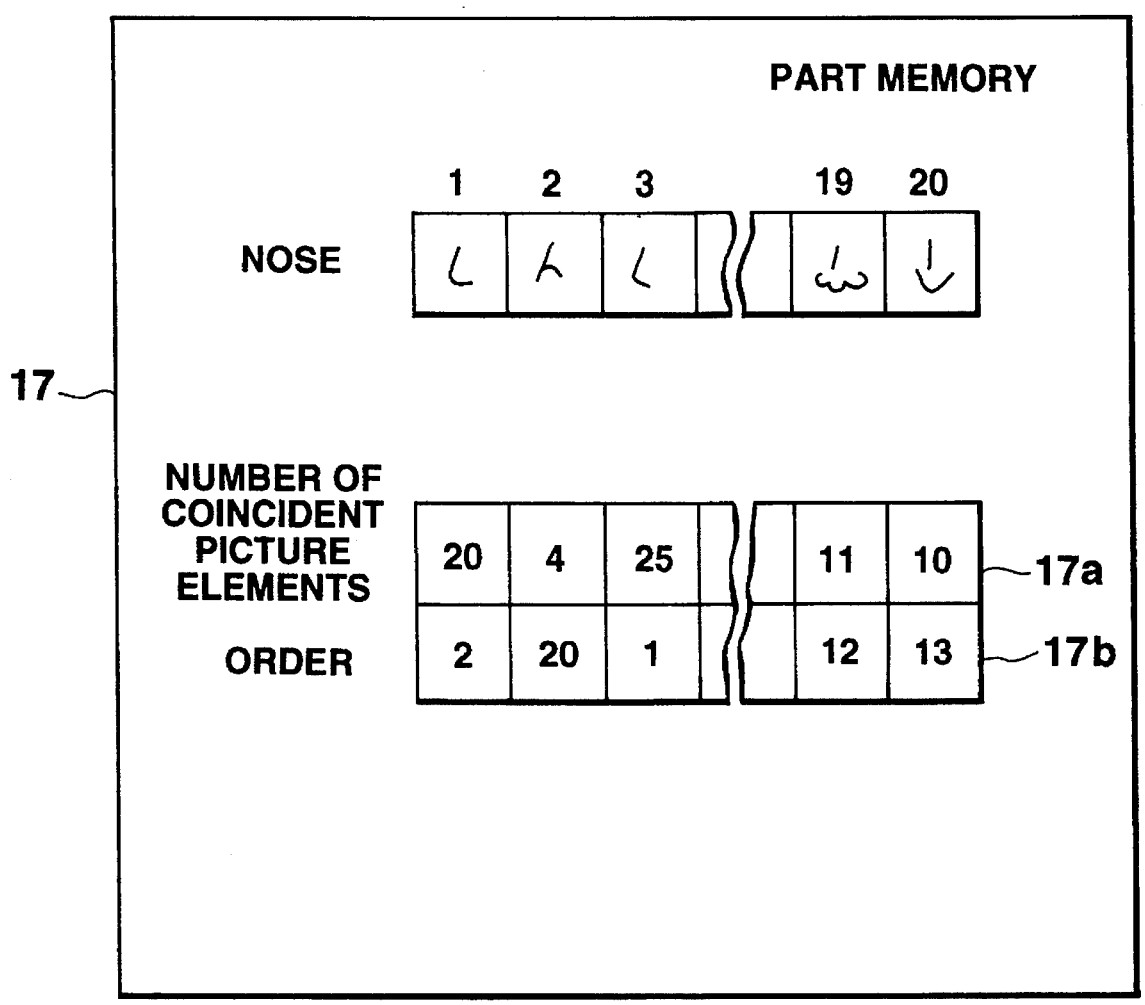
FIG. 2 is a view illustrating a state in which part patterns for a face part "nose" are stored in a part memory of the data processing apparatus.

FIG. 2 is a view illustrating how part patterns for the face part "nose" are stored in the part memory 17.

The part memory 17 is provided with a picture element number register 17a and an order register 17b. The plural sorts of part patterns (1 to 20) for each face part are compared with the image data corresponding to the face part stored in the input-image memory 15, and the number of picture elements of the part pattern which coincide with those of the image data is stored in the picture-element number register. The ascending order (likeness degree) of the number of coinciding picture elements stored in the picture-element number register 17a is stored in the order register 17b (or a likeness degree between the part pattern and the image data for a face part is stored in the order register 17b).

The pattern-matching unit 18 successively reads out image data corresponding to each of the face parts from the input-image memory 15 in accordance with the address data stored in the basic position memory 16, and compares the read out image data with the plural sorts of part patterns for the relevant face part stored in the part memory 17. Further, the pattern-matching unit 18 counts the number of coincident picture elements of the part pattern of a face part which coincide with those of the image data corresponding to the face part. The number of coincident picture elements of each part pattern for each of the face parts is stored in the picture-element number register 17a. The descending order of the number of the coincident picture elements is stored in the order register 17b. In the present embodiment, a degree of resemblance of a part pattern, which is represented in terms of the number of the coincident picture elements, indicates how the part pattern resembles the relevant image data. The part pattern which includes larger number of the coincident picture elements is given a higher degree of resemblance.

The number of the coincident picture elements is obtained by counting outputs of an AND gate to which the image data and the part pattern are supplied. The number of the coincident picture elements increases as the part pattern and the image data show greater resemblance. Taking the face part "nose" as an example, the image data (corresponding to the face part "nose") stored in the central portion of 8 by 10 dots of the input-image memory 15 and data of the part pattern of 8 by 10 dots for the nose are compared with each other dot by dot in a certain direction, and the coincident dots are counted to obtain the number of the coincident dots.

With respect to the plural part patterns for each face part stored in the part memory 17, when the number of the picture elements which coincide with those of the image data corresponding to the relevant face part is stored in the picture-element register 17a and the descending order of the number of the coincident picture elements is stored in the order register 17b, the first part pattern for each of the face parts is read out and the read out part patterns are combined into a portrait of a face of a person. The combined portrait is displayed on the display unit 19.

Figure 3:
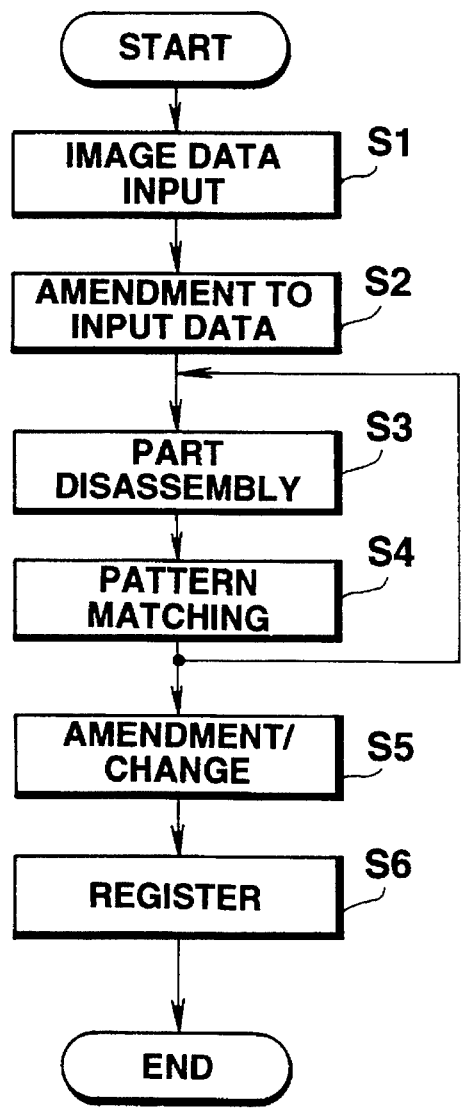
Figure 3:
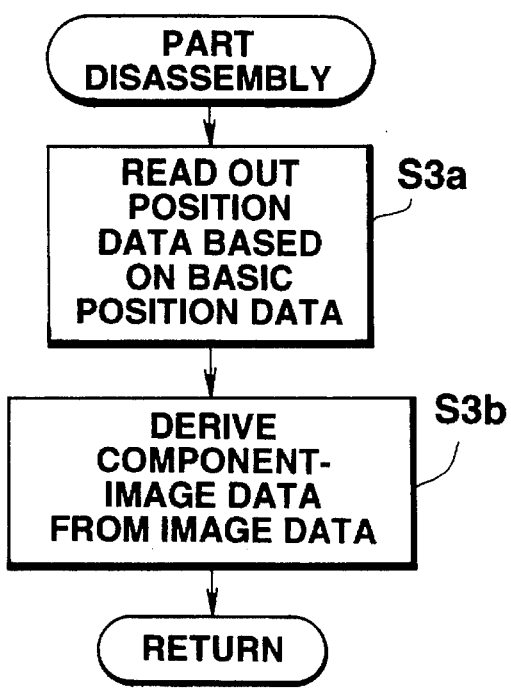
Figure 3:
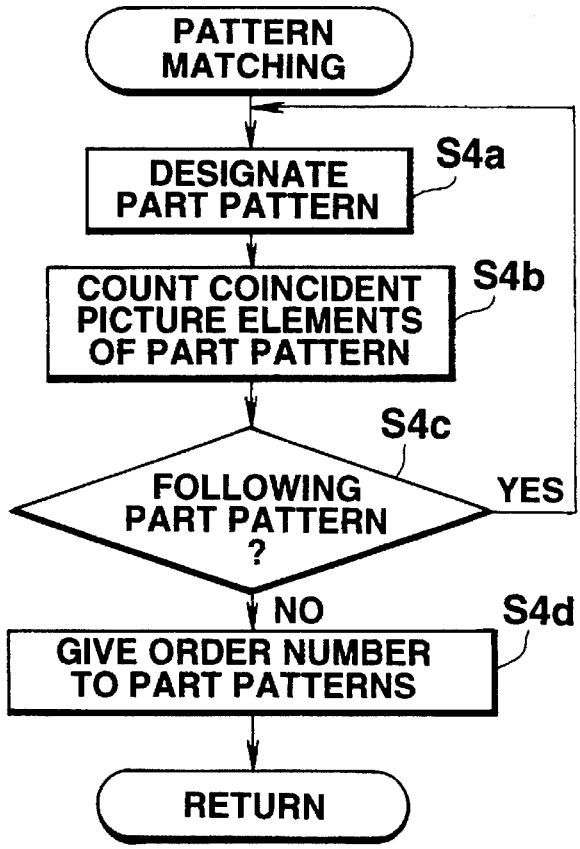

Now, operation of the data processing apparatus with the above mentioned structure will be described with reference to FIGS. 3 and 4.

FIGS. 3(A)–3(C) are flow charts of a portrait composing process of the data processing apparatus. FIG. 3(A) is a flow chart of a fundamental process of the portrait composing process, FIG. 3(B) is a flow chart of a part disassembling process in the portrait composing process, and FIG. 3(C) is a flow chart of a pattern matching process in the portrait composing process.

Figure 4:
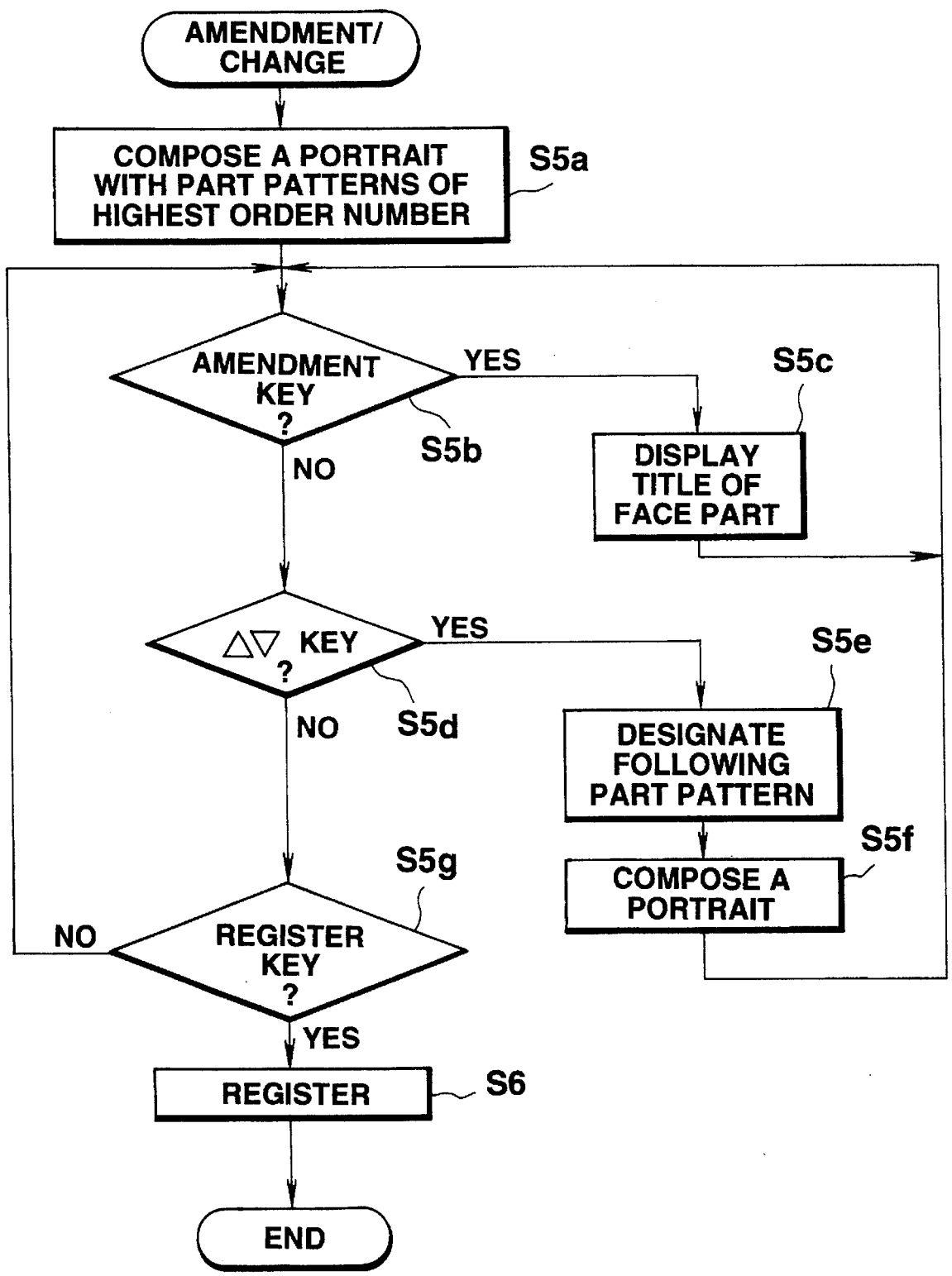
FIG. 4 is a flow chart of an amending/changing process of a portrait pattern in the portrait composing process of the data processing apparatus.

FIG. 4 is a flow chart a portrait pattern amending/changing process in the portrait composing process.

A face-image data taken by the video camera or the electronic still camera is sent as a video signal to the image-data input unit 14. The face-image data is to be stored in a certain memory area of the input-image memory 15. When the image-input key of the key-input unit 12 is operated, the portrait composing program stored in the ROM 13 is driven. Then, the video signal of one field which is input to the image-data input unit 14 is transferred to the Y/C separating circuit 14a and the A/D converting unit 14b, wherein the video signal of one field is converted into digital image data of one frame. The digital image data of one frame is sent through the CPU 11 to the input-image memory 15 to be stored therein (step S1 of FIG. 3(A).

The face-image data of one frame stored in the input-image memory 15 is subjected to an amending process, wherein unnecessary image data of a back ground is eliminated. The operation goes through the part disassembling process to the pattern matching process (steps S2, S3 and S4).

In the part disassembling process, basic position data of each of the face parts such as hair, eye brows, eyes, a nose, a mouth, ears and so on are read out from the basic position memory 16. When basic position data of the face part "hair" is read out, image data corresponding to the face part "hair" is read out, based on the read out basic position data, from among the face-image data stored in the input-image memory 15, and transferred to the pattern-matching unit 18 (steps S3a and S3b).

In the pattern matching process, a first part pattern of the face part "hair" stored in the part memory 17 is designated and transferred to the pattern-matching unit 18 to be compared with the image data of the face part "hair" read out in the part disassembling process (step S4a).

The image data corresponding to the face part "hair" read out from the input-image memory 15 and the first part pattern of the face part "hair" read out from the part memory 17 are compared with each other in the pattern-matching unit 18. Picture elements of the first part pattern which coincide with those of the image data of the face part "hair" are counted and the counted number of the coincident picture elements is stored in the picture-element number register 17a of the part memory 17 corresponding to the first pattern of the face part "hair" (step S4b).

It is judged whether there is in the part memory 17 a following part pattern (a second part pattern of the face part "hair") to be compared with the image data of the face part "hair". When it is determined that the second part pattern of the face part "hair" should be compared, the second part pattern of the face part "hair" stored in the part memory 17 is designated and transferred to the pattern-matching unit 18 (steps S4c to S4a).

The image data corresponding to the face part "hair" read out from the input-image memory 15 and the second part pattern of the face part "hair" read out from the part memory 17 are compared with each other in the pattern-matching unit 18. Coincident picture elements of the second part pattern of the face part "hair" are counted, and the counted number of the coincident picture elements of second part pattern is stored in the relevant picture-element number register 17a of the part memory 17 (step S4b).

Processes at steps S4a to S4c in the pattern matching process are repeatedly executed, and all the part patterns of the face part "hair" previously stored the part memory 17 are successively compared with the image data corresponding to the face part "hair" read out from the input-image memory 15 in the pattern-matching unit 18. The numbers of coincident picture elements are counted with respect to all the part patterns of the face part "hair", and are stored in the relevant picture-element registers 17a, respectively. Thereafter, when it is determined at step S4c that no part pattern of the face part "hair" to be compared is in the part memory 17, the numbers of the coincident picture elements stored in the picture-element registers 17a are given order numbers in a descending order, and the order numbers are stored in the relevant order registers 17b, respectively (steps S4c to S4d).

When the comparing process is finished which compares all the part patterns for the face part "hair" with the image data corresponding to the face part "hair" among the face-image data which has been input as a video signal and the ordering process is finished which gives the order numbers to all the part patterns of the face part "hair", then the part disassembling process at step S3 and the part matching process at step S4 will repeatedly be executed again. In the comparing process, image data corresponding to the face part "eyebrows" is read out from the input-image memory 15 based on the basic-position data following to the basic-position data of the "hair" and is compared with all of part patterns of the face part "eyebrows" stored in the part memory 17. In the ordering process, the order numbers are given to the respective numbers of the coincident picture elements in the part patterns of the "eyebrows".

When the part disassembling process at step S3 and the pattern matching process at step S4 are repeatedly performed, image data of the face-image data corresponding to all the face parts stored in the input-image memory 15 are compared with all the part patterns of the face parts stored in the part memory 17, and the ordering process is performed to give the order numbers to all the part patterns in the part memory 17 (refer to FIG. 2).

When the order numbers are stored in the relevant order registers 17b in the part memory 17 with respect to all the part patterns in the part memory 17, the first order number of the part pattern of each of the face parts ("hair", "eyebrows", "eyes", "nose", "mouth", "ears" and so on) is read out from the part memory 17. The read out part patterns of the first order number with respect to all the face parts are combined into a portrait and displayed on the display unit 19 (step S5a). The displayed portrait is theoretically taken as the one which gives the greatest resemblance to the face-image data stored in the input-image memory 15.

In other words, when the user operates the image-input key 20 and inputs the face-image data of the object person to the input image memory 15 through the image-data input unit 14 and the CPU 11, the part patterns of all the face parts (hair, eyebrows, eyes, a nose, a mouth, ears and so on) are automatically read out from the part memory 17 through the pattern matching process, each of which part patterns gives the most resemblance to the image data corresponding to the relevant face part. The read out part patterns are combined to compose a portrait and the composed portrait is displayed on the display unit 19.

With the composed portrait displayed on the display unit 19 at the above step S5a, which gives the best resemblance to the face-image of the object person, when the user operates the amendment key 21 to make amendment to or to change the displayed portrait, a title of the face part (hair, eyebrows, eyes, a nose, a mouth, ears and so on) to be amended or changed is displayed together with the portrait on the display unit 19 (steps S5b to S5c). In this case, the title of the face part to be amended or changed is initially set, for example, to "hair", and the title is renewed and displayed in order of "eyebrows", "eyes", "a nose" and so on every operation of the amendment key 21.

When the amendment key 21 is operated, for example, for four times, the title of the face part "nose" is selected and displayed on the display unit 19. Then, when the pattern selecting key 22a is further operated, the second part pattern of the face part "nose" is designated and read out from among the plural part patterns stored in the part memory 17 in accordance with the order numbers given to the part patterns of the face part "nose", which order numbers are stored in the order registers 17b (see FIG. 2). The read out second part pattern of the face part "nose" is replaced for the first part pattern and is combined into the portrait displayed on the display unit 19 (steps S5d to S5e, step S5f).

The part pattern designated to be amended or changed is replaced with the following order of part pattern every operation of the pattern-selecting key 22a, and is replaced with the previous order of part pattern every operation of the pattern-selecting key 22b (steps S5d to S5e, step S5f and step S5b).

When a portrait is composed of part patterns of all the face parts which are selected by the user, and a register key (not shown) is operated by the user, then the numbers of the selected part patterns composing the displayed portrait are registered in the RAM and the like as portrait data (steps S5g to S6).

With the above described structure of the data processing apparatus, a video signal of a face image of a person is input through the image-data input unit 14 to the CPU 11 in response to the operation of the image-input key 20, the input video signal is stored as the face-image data in the input image memory 15, the image data corresponding to for each of the face parts is read out from the input-image memory 15 in accordance with the basic position data for each face part which is stored in the basic position memory 16, the image data read out from the image memory 15 is successively compared with the plural part patterns for each of the face parts in the pattern-matching unit 18, which part patterns are stored in the part memory 17, the part pattern of the first order number is designated with respect to each of the face parts, and the designated part patterns of the first order number for the respective face parts are combined to compose a portrait on the display unit 19. As a result, the portrait which shows the best resemblance to the face-image of the object person will be easily obtained without requiring the user to perform troublesome key input operations to select the best part patterns.

The image to be composed is not limited to a human portrait but an image of a full-length of a man may be composed. The objects, images of which are composed may be animals, buildings and other machines such as auto mobiles. If part patterns of components composing the object are prepared and stored in a memory, images of the objects may be composed in the similar manner described with respect to the present embodiment of the invention.

An embodiment of the present invention has been described in detail but these embodiment is simply illustrative and not restrictive. The present invention may be modified in various manners. All the modifications and applications of the present invention will be within the scope and spirit of the invention, so that the scope of the present invention should be determined only by what is recited in the present appended claims and their equivalents.

What is claimed is:

1. A data processing apparatus comprising:

input means for inputting image data of a face of a person, the image data being obtained by taking a picture of the person;

image-data storing means for storing the image data input by said input means;

component-data storing means for previously storing a plurality of pattern data of each of components which compose a human face, said components of the human face including at least eyes, a nose and a mouth, and said plurality of pattern data representing different shapes of the component, respectively;

component-deriving means for deriving component-image data corresponding to one of the components from the image data stored in said image-data storing means;

judging means for determining a degree of resemblance of the pattern data of each of the components to the component-image data of the relevant component derived by said component-deriving means, and for detecting pattern data of a highest degree of resemblance with respect to all the components based on the determined degree of resemblance of the pattern data; and processing means for combining the pattern data detected by said judging means to compose a portrait of the person, whereby a portrait is composed which shows a better resemblance to the face of the person.

2. A data processing apparatus in accordance with claim 1, wherein said component-deriving means comprises:

position-data storing means for storing position data representing a position in said image-data storing means at which component-image data corresponding to each of the components is stored; and reading out means for reading out component-image data based on the position data stored in said position-data storing means.

3. A data processing apparatus in accordance with claim 1, further comprising:

designating means for designating one of said components, the pattern data of which is combined by said processing means to compose the portrait; and amending means for replacing the pattern data of the component designated by said designating means with another pattern data thereof.

4. A data processing apparatus in accordance with claim 3, wherein said amending means comprises:

selecting means for selecting pattern data which is determined by said judging means as of a second highest degree of resemblance as pattern data to be replaced.

5. A data processing apparatus in accordance with claim 1, wherein said judging means comprises:

counting means for counting a number of coincident picture elements of pattern data which coincide with those of the relevant component-image data derived by said component-deriving means; and means for determining a degree of resemblance of the pattern data depending on the number of the coincident picture elements of said pattern data counted by said counting means.

6. A data processing apparatus in accordance with claim 1, wherein said input means comprises:

separating means for separating a luminance signal from a video signal supplied thereto to obtain the image data; and means for converting the luminance signal separated by said separating means into a binary signal.

7. A data processing apparatus comprising:

input means for inputting image data of an object which comprises plural components, the image data including component-image data which correspond to the plural components, respectively;

image-data storing means for storing the image data input by said input means;

component-data storing means for previously storing a plurality of pattern data of each of said plural components of the object;

pattern comparing means for comparing each of said plurality of pattern data of the component stored in said component-data storing means with the component-image data of the corresponding component stored in said image-data storing means;

pattern designating means for designating one of said plurality of pattern data stored in said component data storing means with respect to each of said plural components based on a result of comparison executed by said pattern comparing means; and combining means for combining pattern data designated by said pattern designating means to compose a montage of said object.

8. A data processing apparatus in accordance with claim 7, wherein said comparing means comprises:

counting means for counting a the number of coincident picture elements of pattern data of one of the components which coincide with picture elements of the component-image data of said component stored in said image-data storing means; and means for determining a degree of resemblance of the pattern data of said component to the relevant component-image data of said component depending on the number of the coincident picture elements of said pattern data counted by said counting means.

9. A data processing apparatus in accordance with claim 7, wherein said input means comprises:

separating means for separating a luminance signal from a video signal supplied thereto to obtain the image data; and means for converting the luminance signal separated by said separating means into a binary signal.

10. A data processing apparatus in accordance with claim 7, further comprising:

pattern ranking means for giving the plurality of pattern data a ranking order, respectively, depending on the result of the comparison performed by said pattern comparing means.

11. A data processing apparatus in accordance with claim 10, further comprising:

amending means for replacing the pattern data combined into the montage of the object with another pattern data.

12. A data processing apparatus in accordance with claim 11, wherein said pattern data to be replaced by said amending means is the pattern data which is given a second ranking order by said pattern ranking means.

13. A data processing apparatus in accordance with claim 12, further comprising:

pattern specifying means for specifying pattern data to be amended by said amending means.

14. A data processing apparatus in accordance with claim 7, wherein said image data comprises data of a human face.

15. A data processing apparatus in accordance with claim 14, wherein said image data comprises component-image data of eyes, a nose, a mouth, a hair style, an outline and eyebrows.

16. An image-data processing method for directly taking a picture of an object to obtain image data, and for composing a montage of the object based on the obtained image data, said method comprising the steps of:

a) generating image data of the object;

b) previously preparing plural pattern data of each of components which compose the object;

c) deriving component-image data of one of the components from the generated image data of the object;

d) comparing the plural pattern data of a component with the derived component-image data of the corresponding component;

e) ranking the plural pattern data of the component depending on the result of the comparison; and f) combining the pattern data which are ranked as of the highest rank, indicating a highest degree of resemblance, with respect to all the components, thereby automatically composing the montage of the object which shows a better resemblance to the object. outline and eyebrows.

17. A method according to claim 16, further comprising the steps of:

g) designating one of the components on the composed montage of the object; and h) replacing pattern data of the designated component with a pattern data of the second highest rank.

18. A method according to claim 16, wherein the generating step (a) further comprising the steps of:

i) separating a luminance signal from a supplied video signal to obtain the image data; and j) converting the separated luminance signal into a binary signal.

19. A method according to claim 16, wherein said image data comprises data of a human face and said components comprise eyes, a nose and a mouth.

20. A method according to claim 16, wherein said comparing step (d) comprises the step of:

counting the number of picture elements of pattern data of the component which coincide with those of the derived component-image data of the corresponding component.

* * * * *

UNITED STATES PATENT AND TRADEMARK OFFICE
CERTIFICATE OF CORRECTION

PATENT NO. : 5,487,140
DATED : January 23, 1996
INVENTOR(S) : TOYA

It is certified that error appears in the above-indentified patent and that said Letters Patent is hereby corrected as shown below:

Column 9, line 35 (claim 8), delete "the"

Column 10, lines 36 and 37 (claim 16), delete
    "outline and eyebrows"

Signed and Sealed this

Twenty-ninth Day of October 1996

Attest:

BRUCE LEHMAN

*Attesting Officer*    *Commissioner of Patents and Trademarks*